US012603017B2

(12) United States Patent
Raikar et al.

(10) Patent No.: US 12,603,017 B2
(45) Date of Patent: Apr. 14, 2026

(54) SYSTEMS AND METHODS FOR IMMERSIVE WEATHER AND LATERAL DYNAMICS SIMULATION

(71) Applicant: Torc Robotics, Inc., Blacksburg, VA (US)

(72) Inventors: Akshay Pai Raikar, Blacksburg, VA (US); William Davis, Blacksburg, VA (US); Dakota James Hebert, Blacksburg, VA (US); Makarand Phatak, Blacksburg, VA (US); Joseph R. Fox-Rabinovitz, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 232 days.

(21) Appl. No.: 18/634,474

(22) Filed: Apr. 12, 2024

(65) Prior Publication Data

US 2025/0322764 A1 Oct. 16, 2025

(51) Int. Cl.
*G09B 9/04* (2006.01)
*G09B 9/042* (2006.01)

(52) U.S. Cl.
CPC .................................... *G09B 9/042* (2013.01)

(58) Field of Classification Search
None
See application file for complete search history.

(56) References Cited

U.S. PATENT DOCUMENTS

| | | | | | |
|---|---|---|---|---|---|
| 3,575,046 | A | * | 4/1971 | Shattles | ................. G01L 5/136 |
| | | | | | 73/761 |
| 10,223,479 | B1 | | 3/2019 | Konrardy et al. | |
| 2016/0314224 | A1 | | 10/2016 | Wei et al. | |
| 2020/0209874 | A1 | | 7/2020 | Chen et al. | |
| 2023/0195968 | A1 | | 6/2023 | Chu et al. | |
| 2023/0202507 | A1 | | 6/2023 | Chu | |
| 2024/0051570 | A1 | * | 2/2024 | Foat | ...................... B60W 40/10 |

FOREIGN PATENT DOCUMENTS

| | | | | | |
|---|---|---|---|---|---|
| GB | 2062150 | A | * | 5/1981 | ............ B60T 17/221 |
| WO | WO-2019033210 | A1 | * | 2/2019 | ............... B60D 1/30 |

* cited by examiner

*Primary Examiner* — James B Hull
(74) *Attorney, Agent, or Firm* — ARMSTRONG TEASDALE LLP

(57) ABSTRACT

A simulator is provided. The simulator includes a kingpin configured to couple to a fifth-wheel of a vehicle, a vertical actuator attached to the kingpin and configured to vertically actuate the kingpin, a horizontal actuator attached to the vertical actuator and configured to horizontally actuate the kingpin, and a simulation controller communicatively coupled to the vertical actuator and the horizontal actuator. The simulation controller is configured to retrieve predefined scenario data from a memory device and control the vertical actuator and the horizontal actuator based on the predefined scenario data to simulate mechanical effects of a trailer on the vehicle.

20 Claims, 7 Drawing Sheets

700

SYSTEMS AND METHODS FOR IMMERSIVE WEATHER AND LATERAL DYNAMICS SIMULATION

TECHNICAL FIELD

The field of the disclosure relates generally to simulators and, more specifically, to immersive weather and lateral dynamics simulators for training autonomous vehicles.

BACKGROUND OF THE INVENTION

Simulators enable a person to experience activities such as driving in a virtual environment. Such simulators may utilize, for example, audio and video that respond to a set of simulated driving controls. Such systems are not completely immersive, because they do not replicate all of the feedback a person may experience while actually driving.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a simulator is provided. The simulator includes a kingpin configured to couple to a fifth-wheel of a vehicle, a vertical actuator attached to the kingpin and configured to vertically actuate the kingpin, a horizontal actuator attached to the vertical actuator and configured to horizontally actuate the kingpin, and a simulation controller communicatively coupled to the vertical actuator and the horizontal actuator. The simulation controller is configured to retrieve predefined scenario data from a memory device and control the vertical actuator and the horizontal actuator based on the predefined scenario data to simulate mechanical effects of a trailer on the vehicle.

In another aspect, a method for simulating driving using a vehicle including a fifth-wheel is provided. The method includes retrieving predefined scenario data from a memory device and controlling a vertical actuator and a horizontal actuator based on the predefined scenario data to simulate mechanical effects of a trailer on the vehicle. The vertical actuator is attached to a kingpin coupled to the fifth-wheel and configured to vertically actuate the kingpin, and the horizontal actuator is attached to the vertical actuator and configured to horizontally actuate the kingpin.

In yet another aspect, the disclosed a simulator system is provided. The simulator system includes vehicle including a fifth-wheel and a simulator. The simulator includes a kingpin configured to couple to the fifth-wheel, a vertical actuator attached to the kingpin and configured to vertically actuate the kingpin, a horizontal actuator attached to the vertical actuator and configured to horizontally actuate the kingpin, and a simulation controller communicatively coupled to the vertical actuator and the horizontal actuator. The simulation controller is configured to retrieve predefined scenario data from a memory device and control the vertical actuator and the horizontal actuator based on the predefined scenario data to simulate mechanical effects of a trailer on the vehicle.

Various refinements exist of the features noted in relation to the above-mentioned aspects. Further features may also be incorporated in the above-mentioned aspects as well.

These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
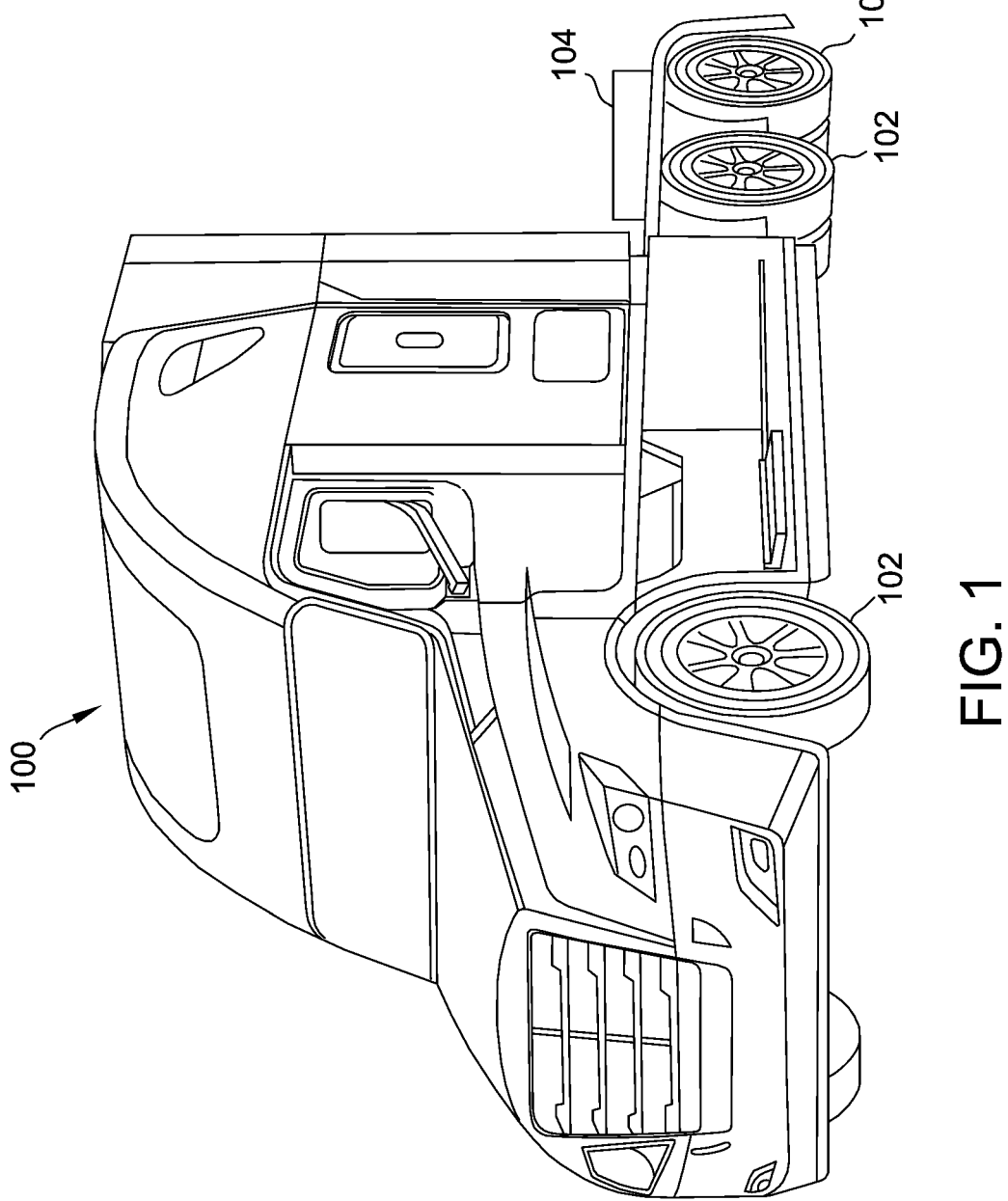
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The embodiments described herein include a simulator. The simulator includes a kingpin configured to couple to a fifth-wheel of a vehicle such as a tractor unit of a semi-trailer truck. The simulator further includes a vertical actuator attached to the kingpin and configured to vertically actuate the kingpin and a horizontal actuator attached to the vertical actuator and configured to horizontally actuate the kingpin. The vertical actuator and horizontal actuator can be controlled to simulate mechanical effects of a trailer on the vehicle (e.g., vibration or forces resulting from road bumps or wind shear). In some embodiments, the simulator further includes dispensers configured to dispense matter (e.g., rain, snow, dust, oil, etc.) proximate to the vehicle to simulate weather or road conditions. In certain embodiments, the simulator also includes rollers configured to receive wheels of the vehicle so that the wheels can be moved (e.g., rotated forwards or backwards) without causing any substantial translational movement of the vehicle within the simulator.

The simulator further includes a simulation controller communicatively coupled to the vertical actuator and the horizontal actuator. The simulation controller is configured to retrieve predefined scenario data from a memory device. This scenario data includes data for executing a simulation using the vehicle, such as audio data, video data, and instructions for controlling actuators such as the vertical actuator and horizontal actuator. The simulation controller is configured to control the vertical actuator, the horizontal actuator, and the dispensers based on the predefined scenario data, thereby providing an immersive experience for a driver operating the vehicle within the simulator that replicates actual road driving.

In some embodiments, the simulator further includes sensors configured to generate sensor data relating to properties of the vehicle during the simulation, such as data relating to movement of wheels of the vehicle (e.g., whether the wheels are moving forward, backward, turning, or slipping). In some such embodiments, simulation controller is configured to use this data as feedback in controlling the vertical actuator and horizontal actuator to simulate how a trailer would respond to certain movements of the vehicle.

This sensor data may further be used as training data for models used to control autonomous vehicles. Because autonomous vehicles may be expected to respond to certain driving conditions that are uncommon on the road or unsafe to collect on an actual road environment, the simulator may enable these conditions to be simulated and corresponding data gathered. Further, because the vehicle may be operated by a human driver during the simulation, this data may enable the model to replicate how a human driver would respond to such situations. This may enable autonomous vehicles operating based on such a model to operate more reliably or in a manner that is more predictable to other drivers on the road during such conditions.

FIG. 1 is a schematic diagram of a vehicle 100. Vehicle 100 includes wheels 102 and a fifth-wheel 104 configured to couple to a corresponding kingpin of a trailer (not shown), enabling vehicle 100 to haul the trailer. In some embodiments, vehicle 100 is capable of partially or fully autonomous operation.

Figure 2:
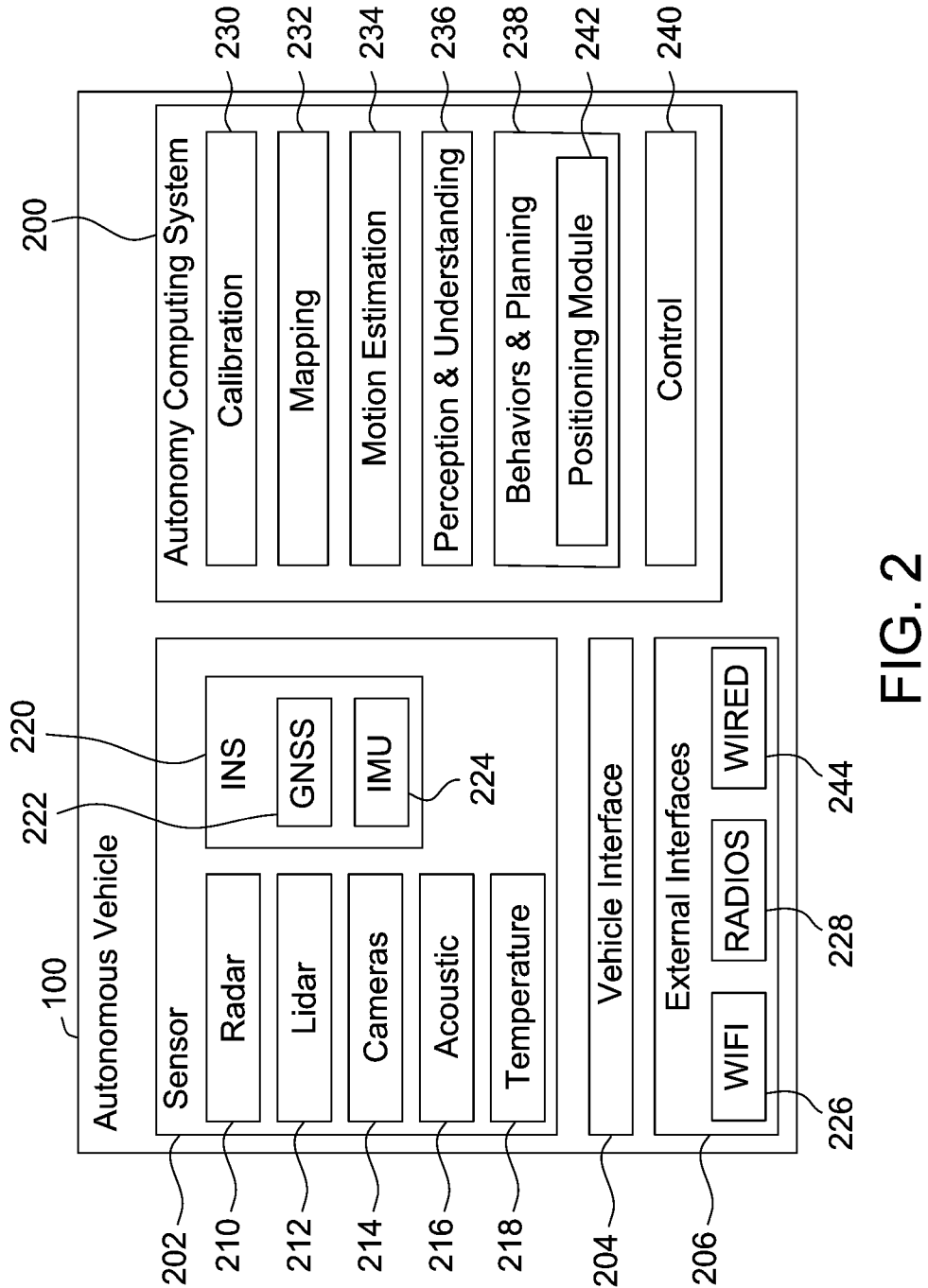
FIG. 2 is a block diagram of an autonomous vehicle.

FIG. 2 is a block diagram of vehicle 100 shown in FIG. 1. In some embodiments, vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of vehicle 100 and its proximity. As described in further detail below, these signals may be used by autonomy computing system 120 to determine how to control operation of vehicle 100.

Cameras 214 are configured to capture images of the environment surrounding vehicle 100 in any aspect or field of view (FOV). The FOV can have any angle or aspect such that images of the areas ahead of, to the side, behind, above, or below vehicle 100 may be captured. In some embodiments, the FOV may be limited to particular areas around vehicle 100 (e.g., forward of vehicle 100, to the sides of vehicle 100, etc.) or may surround 360 degrees of vehicle 100. In some embodiments, vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding vehicle 100. In some embodiments, the image data generated by cameras 214 may be sent to autonomy computing system 200 or other aspects of vehicle 100, and this image data may include vehicle 100 or a generated representation of vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around vehicle 100.

GNSS receiver 222 is positioned on vehicle 100 and may be configured to determine a location of vehicle 100, which it may embody as GNSS data, as described herein. GNSS receiver 222 may be configured to receive one or more signals from a global navigation satellite system (e.g., Global Positioning System (GPS) constellation) to localize vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of vehicle 100. For example, with two GNSS receivers 222, two attitude angles (e.g., roll and yaw) may be measured or determined. In some embodiments, vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about vehicle 100 and its environment.

IMU 224 is a micro-electrical-mechanical (MEMS) device that measures and reports one or more features regarding the motion of vehicle 100, although other implementations are contemplated, such as mechanical, fiber-optic gyro (FOG), or FOG-on-chip (SiFOG) devices. IMU 224 may measure an acceleration, angular rate, and or an orientation of vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of vehicle 100.

In the example embodiment, autonomy computing system 200 employs vehicle interface 204 to send commands to the various aspects of vehicle 100 that actually control the motion of vehicle 100 (e.g., engine, throttle, steering wheel, brakes, etc.) and to receive input data from one or more sensors 202 (e.g., internal sensors). External interfaces 206 are configured to enable vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of vehicle 100 or when downloading mission data after completion of a trip. The connection(s) may be used to download and install various lines of code in the form of digital files (e.g., HD maps), executable programs (e.g., navigation programs), and other computer-readable code that may be used by vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and positioning module 242. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard vehicle 100.

Autonomy computing system 200 of vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
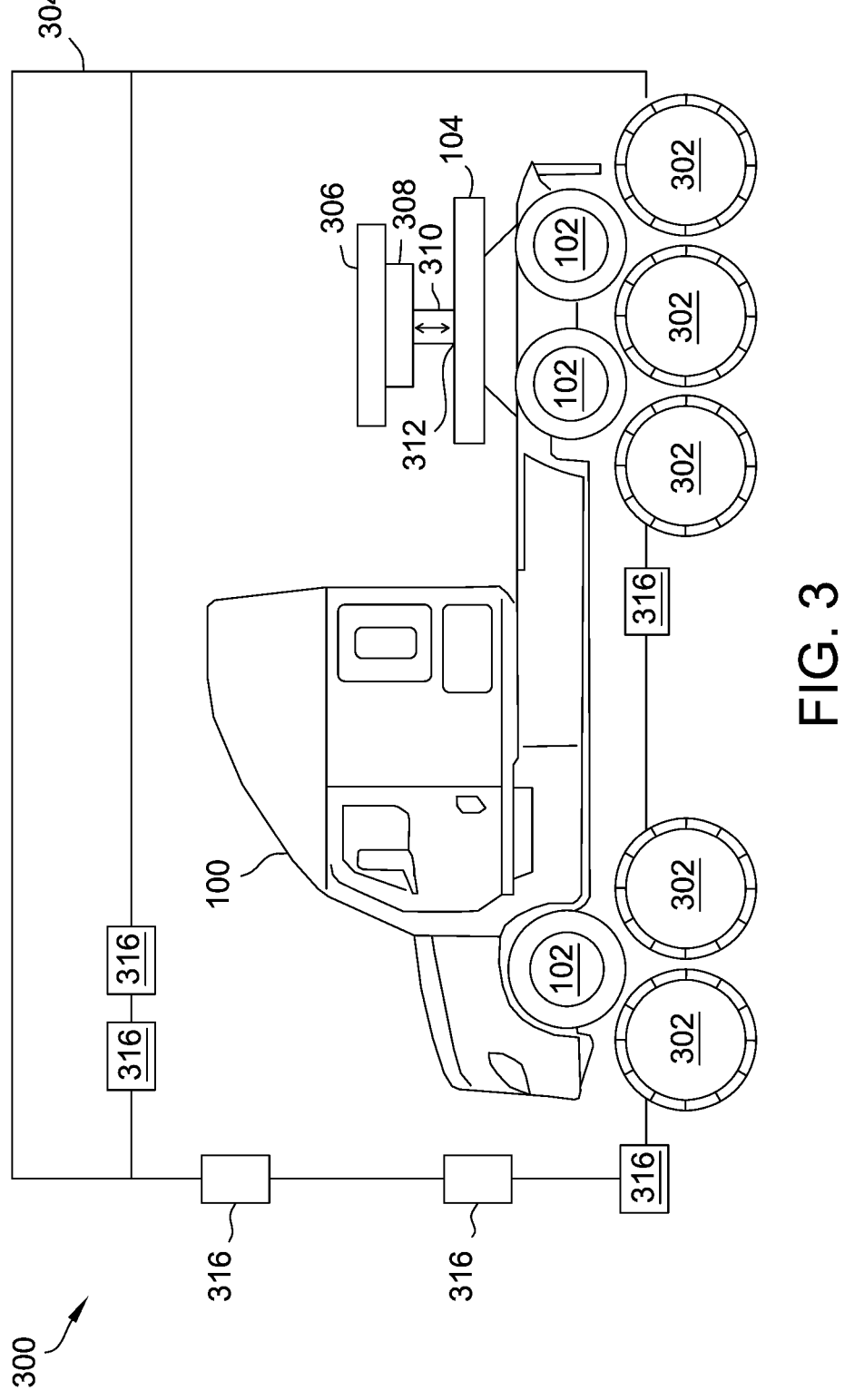
FIG. 3 is a side view of an example simulator.
Figure 4:
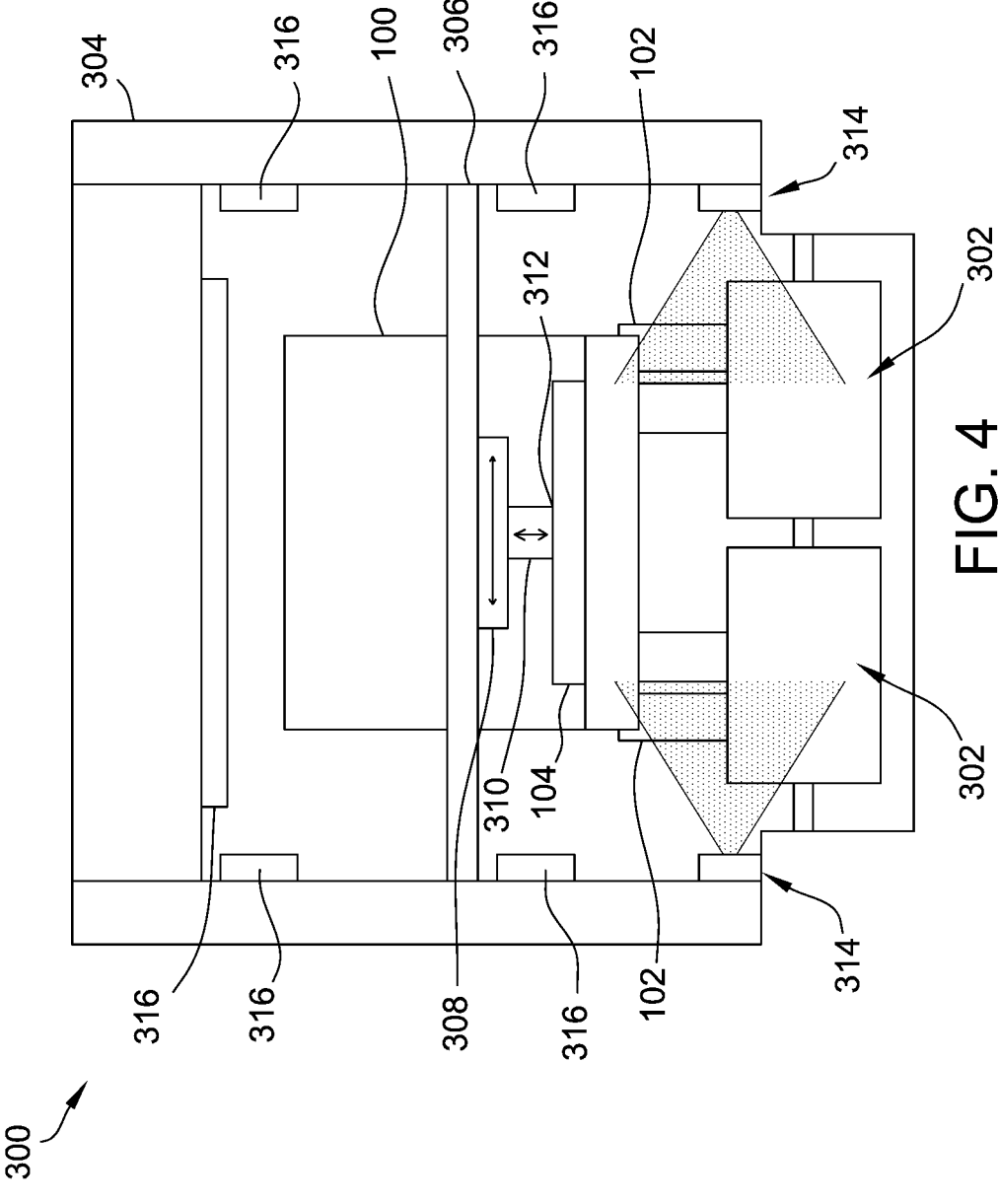
FIG. 4 is a rear view of the example simulator shown in FIG. 3.

FIG. 3 is a side view of a simulator 300 for simulating driving conditions using vehicle 100, and FIG. 4 is a rear view of simulator 300. In the example embodiment, simulator 300 includes a plurality of rollers 302, a frame 304, a horizontal rail 306, a horizontal actuator 308, a vertical actuator 310, a kingpin 312, sensors 314, and dispensers 316.

Rollers 302 are configured to receive wheels 102 and enable wheels 102 to be rotated without vehicle 100 translationally moving (e.g., moving forward or backward). Thus, a driver of vehicle 100 may operate vehicle 100 within simulator 300 as if driving normally (e.g., accelerating, decelerating, and/or turning wheels 102) without vehicle 100 substantially moving with respect to simulator 300. In some embodiments, rollers 302 are free spinning, or are otherwise configured to rotate to compensate for rotation of wheels 102. In certain embodiments, rollers 302 include controllable brakes configured to slow or stop rotation. While depicted in FIG. 3 as receiving all wheels 102 of vehicle 100, in alternative embodiments, rollers 302 may only be present at driven wheels 102 of vehicle 100. For example, if vehicle 100 is rear-wheel drive, rollers 302 may be only present at the rear wheels of vehicle 100, or if vehicle 100 is front-wheel drive, rollers 302 may be only present at the front wheels of vehicle 100. In some embodiments, rollers 302 are covered in a layer of concrete or asphalt to simulate a road surface.

Frame 304 supports horizontal rail 306 above and in a transverse direction with respect to vehicle 100. Horizontal rail 306 in turn supports horizontal actuator 308, vertical actuator 310, and kingpin 312. As shown in FIGS. 3 and 4, in the example embodiment, horizontal actuator 308 is attached to horizontal rail 306, vertical actuator 310 is attached to horizontal actuator 308, and kingpin 312 is attached to vertical actuator 310, although it should be appreciated that horizontal actuator 308, vertical actuator 310, and kingpin 312 can be arranged differently while achieving the same function. Kingpin 312 is configured to couple to fifth-wheel 104, enabling horizontal actuator 308, vertical actuator 310, and kingpin 312 to simulate mechanical effects on vehicle 100 that would result from a presence of a trailer on vehicle 100. For example, horizontal actuator 308 may simulate lateral forces resulting from the trailer, vibration, and wind shear on vehicle 100, and vertical actuator 310 may simulate vertical forces such as a weight of the trailer, vibration, and bumps in the road. As described in further detail below, horizontal actuators 308 and vertical actuators 310 can be controlled to deliver predefined scenarios.

Sensors 314 are configured to generate sensor data based on detected properties of vehicle 100. In particular, sensors 314 detect a rotational position of wheels 102 with respect to rollers 302 (e.g., whether wheels 102 are slipping with respect to rollers 302). For example, sensors 314 may include high-speed cameras, rotational encoders, or other sensors facing wheels 102 and rollers 302 from the side. In some embodiments, wheels 102 or rollers 302 have or are labeled with clearly identifiable features that increase a visibility of rotation. For example, as shown in FIG. 3, rollers 302 may have a grid pattern such as those typically used for optical encoders. Using image matching techniques, radii and rotation rates of wheels 102 and rollers 302 can be measured relative to each other, enabling a difference in tangential linear velocity to be computed. In some embodiments, a preliminary calibration period with normal driving conditions (e.g., conditions under which wheels 102 are unlikely to slip) can be used to establish an empirical baseline rate without utilizing rotational kinematics.

Dispensers 316 are configured to dispense matter such water, snow, ice, air, dust, oil, or other matter that can be used to simulate weather or road conditions. For example, in some embodiments, dispensers 316 include sprinklers, blowers, or snow-machines mounted on frame 304 to simulate the effects of weather on vehicle 100. In certain embodiments, dispensers 316 include sleet, water, and/or oil dispensers pointing toward rollers 302 to simulate the effects of corresponding substances on road surfaces. Like horizontal actuator 308 and vertical actuator 310, dispensers 316 can be controlled to deliver predefined scenarios.

In some embodiments, simulator 300 is also configured to simulate a feeling of longitudinal acceleration on a driver of vehicle 100. For example, in some such embodiments, seats of vehicle 100 include actuators configured to accelerate the driver forward and backward for small distances to simulate acceleration and deceleration of vehicle 100, before returning to their normal position sufficiently slowly that the human body does not detect the motion. Additionally or alternatively, an entire cab of vehicle 100 may be actuated similarly, or rollers 302 may be actuated transitional (e.g., forward or backward) to move vehicle 100 to simulate acceleration or deceleration.

In some embodiments, simulator 300 may also include other components for presenting audio, video, or other aspects of a simulation to a driver of vehicle 100. Like horizontal actuator 308, vertical actuator 310, and dispensers 316, these other components can be controlled to deliver predefined scenarios.

Figure 5:
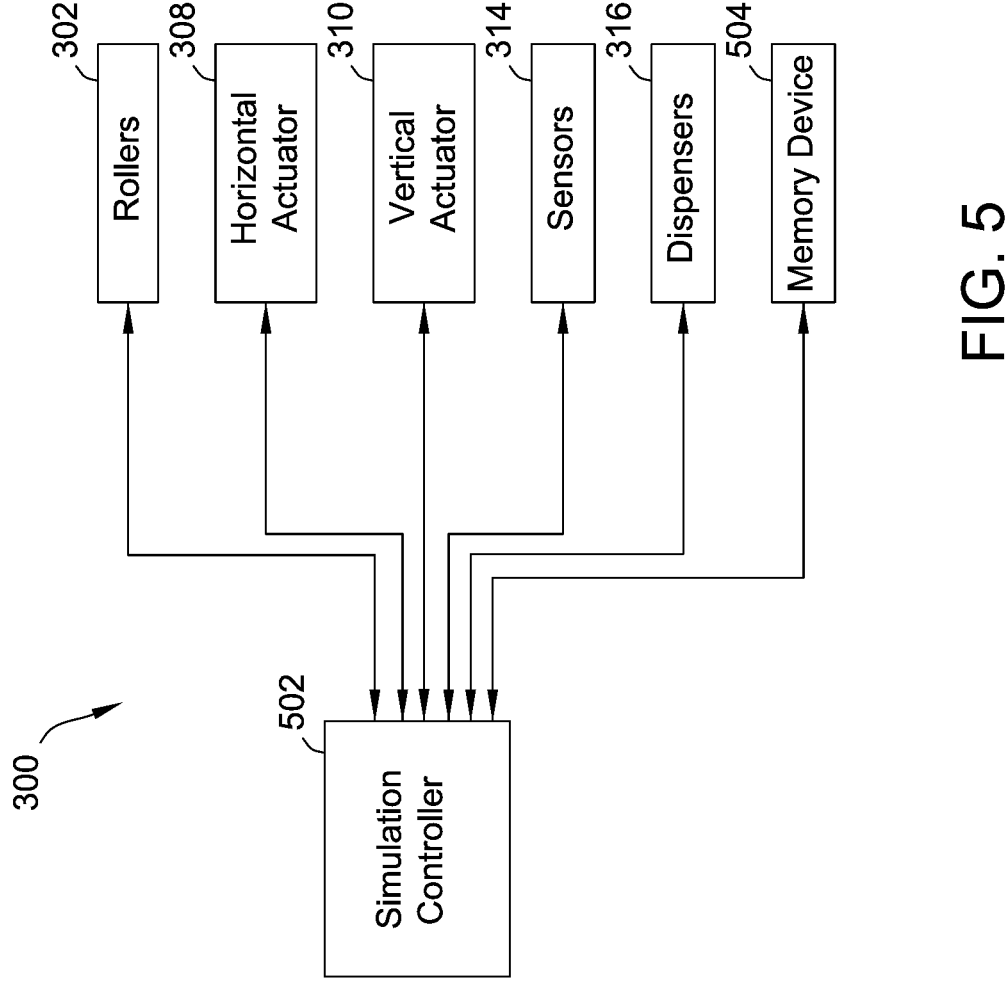
FIG. 5 is a block diagram of the example simulator shown in FIGS. 3 and 4.

FIG. 5 is a block diagram of simulator 300. As shown in FIG. 5, in the example embodiment, simulator 300 further includes a simulation controller 502 and a memory device 504. Simulation controller 502 is coupled in communication with rollers 302 (e.g., in cases where rollers 302 include controllable brakes or actuators), horizontal actuator 308, vertical actuator 310, sensors 314, dispensers 316, and memory device 504.

In the example embodiment, memory device 504 stores one or more predefined scenarios that may be presented to a driver of vehicle 100 using simulator 300. Each simulation may include predefined sequences of video, audio, actuation sequences of horizontal actuators 308 and vertical actuations 310 (e.g., to simulate effects wind shear and road bumps would have on a trailer pulled by vehicle 100), and sequences of dispensing matter (e.g., corresponding simulated weather or road conditions) from dispensers 316. Simulation controller 502 is configured to retrieve data relating to the predefined scenarios from memory device 504 and transmit control signals to, for example, rollers 302, horizontal actuator 308, vertical actuator 310, dispensers 316, or other components of simulator 300 based on the predefined scenario. When the predefined scenario is executed by simulator 300, a driver of vehicle 100 experiences similar conditions to those as the driver would in an actual road environment, including the effects of towing a trailer on vehicle 100.

In the example embodiment, simulation controller 502 is configured to control aspects of the simulation based on sensor data received from sensors 314 in addition to data retrieved from memory device 504. This sensor data serves as feedback data indicating when vehicle 100 is accelerating, decelerating, turning, or otherwise moving within the simulated environment. For example, if simulation controller 502 determines a trailer would respond in a certain way to a detected movement of vehicle 100, simulation controller may control horizontal actuator 308 and vertical actuator 310 to simulate this response.

In the example embodiment, simulation controller 502 is configured to record sensor data received from sensors 314 during a simulation in memory device 504. Because this sensor data indicates how vehicle 100 or its driver reacts do different driving conditions presented by simulator 300, this data may be used to train an autonomous vehicle to respond to similar conditions. For example, in some cases, a large number of simulations may be performed using simulator 300 using different drivers or different predefined scenarios, and sensor data may be collected during each of the simulations. This data can then be used to train a model that can be used, for example, by autonomy computing system 200 to control operation of an autonomous vehicle. This enables the model to be trained using data corresponding to situations that may not commonly be found on actual roads or be dangerous to capture in an actual road situation. Additionally, because the training data is derived from human drivers reacting to simulated road conditions, this model may enable autonomy computing system 200 to control an autonomous vehicle to react similarly to a human driver in response to actual road conditions. This is advantageous in that autonomy computing system 200 can utilize the experiences of human drivers in learning how to react to driving conditions, and in that because autonomy computing system 200 can control an autonomous vehicle to behave similarly to a human driver, behavior of the autonomous vehicle may be easier to predict by human drivers sharing the road.

Figure 6:
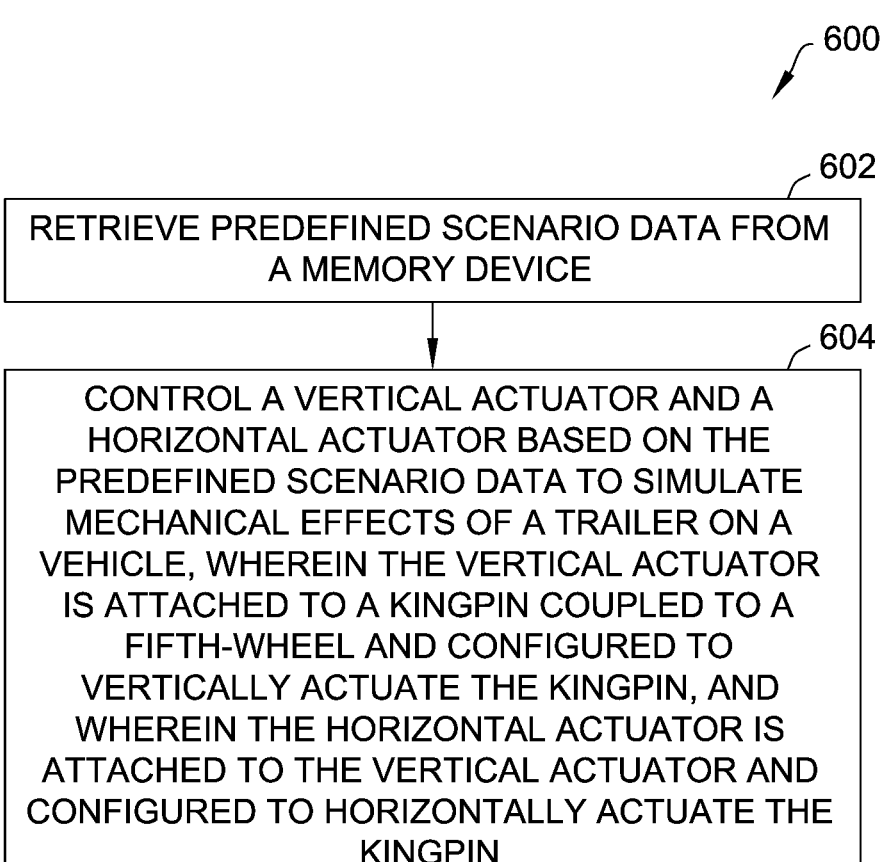
FIG. 6 is a flowchart of an example method for simulating driving using the simulator shown in FIGS. 3-5.

FIG. 6 is a flow chart illustrating an example method 600 for simulating driving using simulator 300 (shown in FIGS. 3-5). In the exemplary embodiment, simulation controller 502 retrieves 602 predefined scenario data from memory device 504. In the exemplary embodiment, simulation controller 502 also controls 604 a vertical actuator 310 and horizontal actuator 308 based on the predefined scenario data to simulate mechanical effects of a trailer on vehicle 100. Vertical actuator 310 is attached to kingpin 312 coupled to fifth-wheel 104 and configured to vertically actuate kingpin 312, and horizontal actuator 308 is attached to vertical actuator 310 and configured to horizontally actuate kingpin 312.

In some embodiments, at least one sensor 314 is communicatively coupled to simulation controller 502 and configured to generate sensor data relating to movement of wheels of the vehicle. In some such embodiments, simulation controller 502 controls vertical actuator 310 and horizontal actuator 308 based on the sensor data to simulate mechanical effects of the trailer on the vehicle.

In certain embodiments, a plurality of rollers 302 receive wheels 102 of vehicle 100 to enable rotation of wheels 102 of vehicle 100 without translational movement of vehicle 100. In some such embodiments, the sensor data indicates a rotational position of wheels 102 of vehicle 100 relative to a rotational position of rollers 302.

In some embodiments, simulation controller 502 records the sensor data in memory device 504.

In certain embodiments, at least one dispenser 316 dispenses matter simulating road conditions or weather conditions, and simulation controller 502 is further controls at least one dispenser 316 based on the predefined scenario data.

Figure 7:
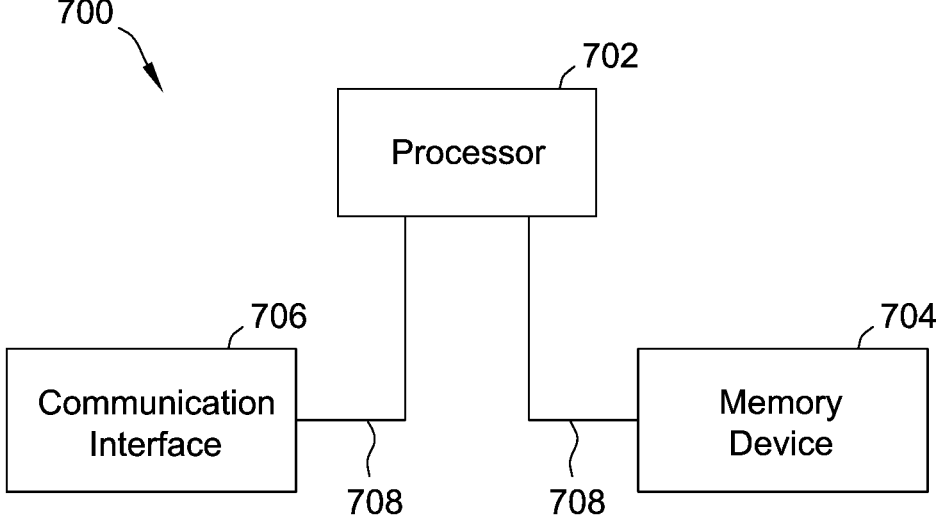
FIG. 7 is a block diagram of an example computing device.

FIG. 7 is a block diagram of an example computing device 700. Computing device 700 includes a processor 702 and a memory device 704. The processor 702 is coupled to the memory device 704 via a system bus 708. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 704 includes one or more devices that enable information, such as executable instructions or other data (e.g., sensor data), to be stored and retrieved. Moreover, the memory device 704 includes one or more computer readable media, such as, without limitation, dynamic random access memory (DRAM), static random access memory (SRAM), a solid state disk, or a hard disk. In the example embodiment, the memory device 704 stores, without limitation, application source code, application object code, configuration data, additional input events, application states, assertion statements, validation results, or any other type of data. The computing device 700, in the example embodiment, may also include a communication interface 706 that is coupled to the processor 702 via system bus 708. Moreover, the communication interface 706 is communicatively coupled to data acquisition devices.

In the example embodiment, processor 702 may be programmed by encoding an operation using one or more executable instructions and providing the executable instructions in the memory device 704. In the example embodiment, the processor 702 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: (a) providing a driving simulation that includes physical feedback to simulate a trailer by utilizing a horizontal and vertical actuators configured to actuate a kingpin coupled to a fifth wheel of a vehicle utilized for the driving simulation; (b) improving feedback during a driving simulation that includes physical feedback to simulate a trailer by controlling a horizontal and vertical actuators configured to actuate a kingpin coupled to a fifth wheel of a vehicle utilized for the driving simulation based on sensor data relating to the vehicle; (c) providing a driving simulation that includes physical feedback to simulate road and weather conditions by utilizing dispensers that release matter near a vehicle utilized for the driving simulation; and/or (d) providing data that can be used to train an autonomous driving model by collecting sensor data during a driving simulation that uses physical feedback to replicate a presence of a trailer on the vehicle, road conditions, and weather conditions.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A simulator comprising:
   a kingpin configured to couple to a fifth-wheel of a vehicle;
   a vertical actuator attached to the kingpin and configured to vertically actuate the kingpin;
   a horizontal actuator attached to the vertical actuator and configured to horizontally actuate the kingpin;
   a simulation controller communicatively coupled to the vertical actuator and the horizontal actuator, the simulation controller configured to:
      retrieve predefined scenario data from a memory device; and
      control the vertical actuator and the horizontal actuator based on the predefined scenario data to simulate mechanical effects of a trailer on the vehicle.

2. The simulator of claim 1, further comprising at least one sensor communicatively coupled to the simulation controller and configured to generate sensor data relating to movement of wheels of the vehicle.

3. The simulator of claim 2, wherein the simulation controller is further configured to control the vertical actuator and the horizontal actuator based on the sensor data to simulate mechanical effects of the trailer on the vehicle.

4. The simulator of claim 2, further comprising a plurality of rollers configured to receive the wheels of the vehicle to enable rotation of the wheels of the vehicle without translational movement of the vehicle.

5. The simulator of claim 4, wherein the sensor data indicates a rotational position of the wheels of the vehicle relative to a rotational position of the plurality of rollers.

6. The simulator of claim 2, wherein the simulation controller is further configured to record the sensor data in the memory device.

7. The simulator of claim 1, further comprising at least one dispenser configured to dispense matter simulating road conditions or weather conditions, wherein the simulation controller is further configured to control the at least one dispenser based on the predefined scenario data.

8. A method for simulating driving using a vehicle including a fifth-wheel, said method comprising:
   retrieving predefined scenario data from a memory device; and
   controlling a vertical actuator and a horizontal actuator based on the predefined scenario data to simulate mechanical effects of a trailer on the vehicle, wherein the vertical actuator is attached to a kingpin coupled to the fifth-wheel and configured to vertically actuate the kingpin, and wherein the horizontal actuator is attached to the vertical actuator and configured to horizontally actuate the kingpin.

9. The method of claim 8, further comprising generating sensor data relating to movement of wheels of the vehicle using at least one sensor.

10. The method of claim 9, further comprising controlling the vertical actuator and the horizontal actuator based on the sensor data to simulate mechanical effects of the trailer on the vehicle.

11. The method of claim 9, wherein a plurality of rollers receive the wheels of the vehicle to enable rotation of the wheels of the vehicle without translational movement of the vehicle.

12. The method of claim 11, wherein the sensor data indicates a rotational position of the wheels of the vehicle relative to a rotational position of the plurality of rollers.

13. The method of claim 9, further comprising recording the sensor data in the memory device.

14. The method of claim 8, further comprising dispensing, using at least one dispenser, matter simulating road conditions or weather conditions based on the predefined scenario data.

15. A simulator system comprising:
   a vehicle comprising a fifth-wheel; and
   a simulator comprising:
      a kingpin configured to couple to the fifth-wheel;
      a vertical actuator attached to the kingpin and configured to vertically actuate the kingpin;
      a horizontal actuator attached to the vertical actuator and configured to horizontally actuate the kingpin;
      a simulation controller communicatively coupled to the vertical actuator and the horizontal actuator, the simulation controller configured to:
         retrieve predefined scenario data from a memory device; and
         control the vertical actuator and the horizontal actuator based on the predefined scenario data to simulate mechanical effects of a trailer on the vehicle.

16. The simulator system of claim 15, wherein the simulator further comprises at least one sensor communicatively coupled to the simulation controller and configured to generate sensor data relating to movement of wheels of the vehicle.

17. The simulator system of claim 16, wherein the simulation controller is further configured to control the vertical actuator and the horizontal actuator based on the sensor data to simulate mechanical effects of the trailer on the vehicle.

18. The simulator system of claim 16, wherein the simulator further comprises a plurality of rollers configured to receive the wheels of the vehicle to enable rotation of the wheels of the vehicle without translational movement of the vehicle.

19. The simulator system of claim 18, wherein the sensor data indicates a rotational position of the wheels of the vehicle relative to a rotational position of the plurality of rollers.

20. The simulator system of claim 16, wherein the simulation controller is further configured to record the sensor data in the memory device.

* * * * *